United States Patent [19]
Artois et al.

[11] 4,369,066
[45] Jan. 18, 1983

[54] PROCESS OF PRODUCTION OF COLLOIDAL MORTAR AND PRODUCT ACCORDING TO THIS PROCESS

[75] Inventors: Fernand Artois, Strassen; Raymond Linden, Differdange; Alberg Feitler, Kopstal, all of Luxembourg

[73] Assignee: Arbed S.A., Luxembourg, Luxembourg

[21] Appl. No.: 342,168

[22] Filed: Jan. 25, 1982

Related U.S. Application Data

[63] Continuation-in-part of Ser. No. 158,778, Jun. 12, 1980, abandoned.

[30] Foreign Application Priority Data

Jul. 17, 1979 [LU] Luxembourg .............................. 81524

[51] Int. Cl.³ ................................................ C04B 7/02
[52] U.S. Cl. ........................................ 106/98; 106/99
[58] Field of Search .............................. 106/89, 98, 99

[56] References Cited

U.S. PATENT DOCUMENTS 3,389,003 6/1968 Gado ..................................... 106/98
4,093,471 6/1978 Greig ..................................... 106/99
4,280,847 7/1981 Hacheney ............................. 106/89

Primary Examiner—James Poer
Attorney, Agent, or Firm—Michael J. Striker

[57] ABSTRACT

A process of producing a colloidal mortar suitable for use as a lining of steel conduit pipes, boilers or the like, includes filling a mixer with water while imparting to water a rotary motion by a rotary agitator at a speed of 1500 m/minutes, feeding the mixer with cement while maintaining the rotary motion whereby the mixture forms a funnel-like profile within the mixer and adding to the mixture wet sand of humidity of 5–15% and in proportion of 1 to 2 parts of the cement content to obtain the colloidal mortar. Fiber rovings may be added to the colloidal mortar.

5 Claims, 2 Drawing Figures

PROCESS OF PRODUCTION OF COLLOIDAL MORTAR AND PRODUCT ACCORDING TO THIS PROCESS

CROSS-REFERENCE TO A RELATED APPLICATION

This application is a continuation-in-part of the application Ser. No. 158,778 filed June 12, 1980, now abandoned.

BACKGROUND OF THE INVENTION

The present invention relates to a process for the production of colloidal mortar, particularly for the lining of shaped steel parts such as pipe conduits, and also to the product obtained according to this process.

It is known that the high-colloidal cement-water mixtures suitable for many applications, can also be used as economic substitute for expensive coatings, paints, lacquers, or plastic linings with, for instance, an organic polymer base. One of the main advantages of these mixtures lies in the fact that the shaped steel parts to be coated will not require any previous surface treatment, for instance by sand blasting, which would represent a high factor in calculating production cost for conventional corrosion protection.

A high colloidal cement-water mixture may, for instance, be produced by a process described in the German Patent Application P No. 27 18 236.1, which provides for premixing in a mixer and water, in a proportion of 0.25–0.6, for a period of about two minutes and at a velocity of about 300 m/minute, and then exposing it for at least 8 minutes to a mass acceleration of minimum 2 g ($g = 9.81$ m/sec$^2$).

Lining mixtures may be produced in this manner, showing, amongst other properties, high adhesion to unprepared steel surfaces. In order to increase the cohesion of the layer finely-cut organic or inorganic fibres may be added to the mixture. The products treated in such a way will have medium pressure and flexural strengths of 850 kp/cm$^2$ or, respectively, 250 kg/cm$^2$ (layer thickness 6 mm, curing period 28 days).

It is also known how to use for the outer lining of piping conventional cement-sand-water mixtures with added glass fibers. It is, however, not possible to apply these mixtures to rounded components such as tubes, boilers, or the like, without the aid of bandages. In consequence thereof, however, the economy of the mixture obtained by the adding of sand will become lost by additional, labor-intensive, expense.

SUMMARY OF THE INVENTION

It is an object of the invention to provide a process of the production of colloidal mortar, the application of which will not be fraught with the aforenamed disadvantages. This object is attained by the process which is characterized by filling a mixer with water in the proportion of 25 to 60% relative to the quantity of cement, using a rotary agitator to impart to water a rotary motion of a peripheral speed of 1500 m/minute at the external diameter of the agitator, then charging the mixer with cement whilst maintaining the rotary motion of the agitator, or reducing it to half of the peripheral speed, and adding a proportion of 1 to 2 parts of sand relative to the cement quantity, the sand having a humidity of 5 to 15% and being fed in such a manner that the wet sand will reach the center of the funnel-like vortex formed by the mix.

The process as per invention has been developed on basis of numerous tests which proved that, under certain circumstances, it is possible to produce high-colloidal mixtures with a high proportion of sand, said mixtures being, contrary to mixtures that are non-colloidal or only partially so, excellent for the lining of rounded components without needing bandages.

It has also been determined, that adding sand as per invention will, unexpectedly, allow using under conditions as per invention, cements of lesser value and which allow for good colloidability, but which would often yield mixtures without sufficient adhesion, so that this will bring undisputed advantages relative to production cost and also relative to the raw materials supply.

It has however proved, that even very small deviations from the individual process steps, such as, for instance, too high or too low sand humidity, or feeding the sand in a manner not appropriate to the process, will result in production failure.

In the instance of the sand not being fed in a manner conforming to the process, the mixture may rise along the walls of the mixer and harden there, whilst a hollow space will have formed around the vanes of the agitator, with the agitator rotating within such a hollow space but not having any effect.

Whilst the adhesion of the colloidal mortar obtained by the process as per invention may be virtually equal to colloidal concrete made from pure and best cement, the new product has shown an unexpectedly high cohesion within the layer.

It will, in fact, suffice for 0.5 to 1.5% of glass fiber rovings to lend the necessary cohesion to the colloidal mortar layers as applied, without having to take recourse to special auxiliary means, such as bandages in particular.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
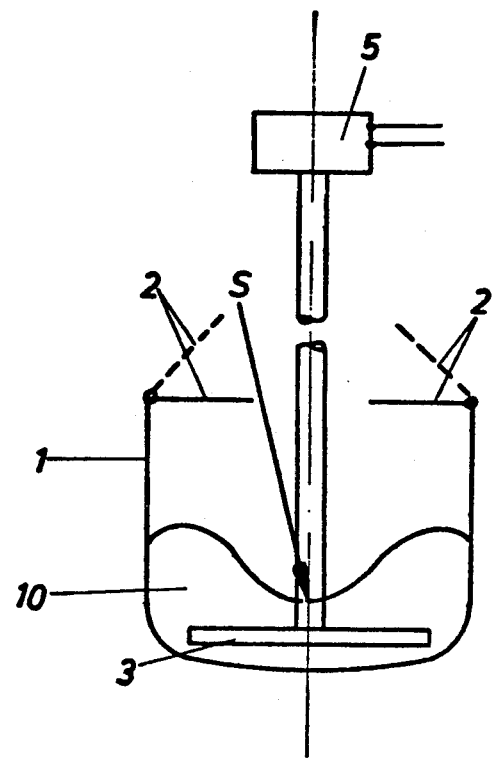
FIG. 1 is a sectional view through a suitable mixer for carrying out a process according to the invention.
Figure 2:
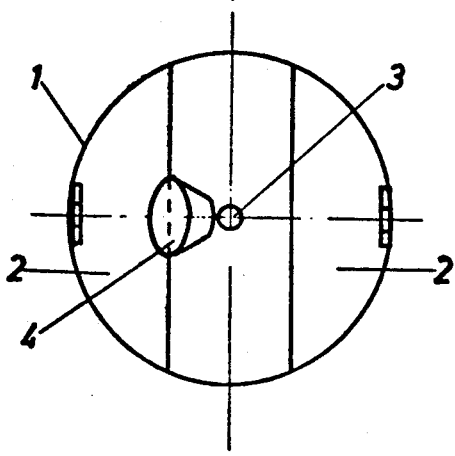
FIG. 2 is a top view of FIG. 1.

A mixer for carrying out the process of the invention includes a jacket 1 which has two hinged covers 2. An agitator 3, driven by a motor 5 is appurtenant to the mixing device. The motor can be set for two speeds, one of which is twice as high than the other. With closed covers 2, adding of sand may be effected in such a manner that this charge will reach the center of the profile of the agitated mix 10 as shown by an arrow S. A funnel 4 of an appropriate shape may be used for this purpose, being introduced at an inclination into the open space between the cover 2 and the arm of the agitator 3, so that the charge will reach the mix at the point exactly intended therefor.

As indicated in FIG. 1, the mixture will, upon agitation, assume a motion reminiscent of a lemniscate, with its surface profile forming a centered funnel. It is important that the charge will reach that funnel.

A colloidal mortar produced as per invention will, depending upon the proportion of sand, show the following mechanical properties:

flexural strength after 7 days: 90–120 kp/cm$^2$
flexural strength after 28 days: 115–140 kp/cm$^2$
pressure strength after 7 days: 450–650 kp/cm$^2$
pressure strength after 28 days: 615–750 kp/cm$^2$ These test values are lower than the values obtainable with high-colloidal cement mortar without added sand, but the strength values obtained are thoroughly adequate for the intended application.

Construction components from steel of any geometrical shape, may be lined with the colloidal mortar as per invention and in layers of up to 120 mm, without any problems or the need for bandages.

A working example of the process of production of colloidal mortar in accordance with the invention is given below.

EXAMPLE

The process of producing colloidal mortar includes the following steps:

1. filling a mixer with blades of diameter of 0.56 m with water;
2. agitating water with speed of about 1500 m/min;
3. adjusting the peripheral speed of the blades to 5275 m/min;
4. charging the mixer with cement while maintaining the agitation for about 4 minutes to produce a colloidal mixture of cement and water;
5. reducing peripheral speed to 2000 m/min;
6. adding to the mixture a proportion of 1 or 2 parts of sand relative to the quantity of cement;
7. and continuing mixing for about 2 minutes which is sufficient to obtain colloidal mortar.

It will be understood that each of the elements described above, or two or more together, may also find a useful application in other types of methods of production of colloidal mortar differing from the types described above.

While the invention has been illustrated and described as embodied in a process of producing colloidal mortar, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process of production of colloidal mortar, for use particularly in lining of shaped components of steel, such as conduit pipes, boilers and the like, comprising the steps of filling a mixer with water in proportion of 25 to 60% relative to the quantity of cement to be filled into the mixer; imparting to water a rotary motion by means of a rotary agitator so that the peripheral velocity at the external diameter of the agitator will amount to a minimum of 1500 m/minutes, charging the mixer with cement whilst maintaining the rotary motion of the agitator, or reducing it to half of said peripheral velocity, said mixture forming during said rotary motion a funnel-like profile having a center; adding to the mixture a proportion of 1 to 2 parts of sand relative to the quantity of cement in the mixer, the sand having a humidity of 5–15% and being fed into the mixer so that the wet sand will reach the center of said funnel-like profile formed by said mixture; and continuing agitation for about 2 minutes until the colloidal mortar is obtained.

2. The process of claim 1, further comprising the step of adding to the colloidal mortar fiber rovings in proportion of 0.5 to 1.5 of weight percent.

3. The process of claim 2, wherein said fiber rovings are glass rovings.

4. The process of claim 1, wherein said charging step lasts for about 4 minutes to produce a colloidal mixture of cement and water.

5. A colloidal mortar, particularly for lining of shaped components of steel, such as conduit pipes, boilers and the like produced according to a method as defined in claim 1.

* * * * *